United States Patent
Zhou et al.

(10) Patent No.: US 8,094,674 B2
(45) Date of Patent: Jan. 10, 2012

(54) METHOD AND SYSTEM FOR IMPLEMENTING NETWORK DEVICE ACCESS MANAGEMENT

(75) Inventors: Jianguang Zhou, Shenzhen (CN); Yijiong Zhang, Shenzhen (CN); Xuejiang Zhang, Shenzhen (CN); Jianjun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 486 days.

(21) Appl. No.: 11/972,991

(22) Filed: Jan. 11, 2008

(65) Prior Publication Data

US 2008/0109512 A1  May 8, 2008

Related U.S. Application Data

(63) Continuation of application No. PCT/CN2006/001287, filed on Jun. 12, 2006.

(30) Foreign Application Priority Data

Jul. 13, 2005 (CN) .......................... 2005 1 0083132

(51) Int. Cl.
*H04J 3/02* (2006.01)
(52) U.S. Cl. ......... 370/462; 370/431; 709/218; 709/219
(58) Field of Classification Search .................. 370/431, 370/462; 709/217–219

See application file for complete search history.

(56) References Cited

U.S. PATENT DOCUMENTS

| | | | |
|---|---|---|---|
| 6,253,327 B1 * | 6/2001 | Zhang et al. | 726/14 |
| 6,298,383 B1 * | 10/2001 | Gutman et al. | 709/229 |
| 2003/0039268 A1 * | 2/2003 | Chong et al. | 370/466 |
| 2004/0030787 A1 | 2/2004 | Jandel et al. | |

FOREIGN PATENT DOCUMENTS

AU 20032895999 2/2005

(Continued)

OTHER PUBLICATIONS

Nick Marly, et al: "Service Selection in the Access Network", ICC 2001, 2001 IEEE International Conference on Communications, Conference Record, Helsinky, Finland, Jun. 11-14, 2001 [IEEE International Conference on Communications], New York, Ny: IEEE, US, vol. 5, Jun. 11, 2001, pp. 1622-1626, XP010553789.

European Search Report—dated Jul. 22, 2008; Application No./Patent No. 06742156.0-1244/1909433 PCT/CN2006001287.

(Continued)

*Primary Examiner* — Hassan Kizou
*Assistant Examiner* — Siming Liu
(74) *Attorney, Agent, or Firm* — Brinks Hofer Gilson & Lione

(57) ABSTRACT

A method and system for implementing network device access management. The system includes at least one device domain storage unit and at least one Access Server (AS), and the method groups all network devices into at least one device domain managed by at least one AS; sets a uniform communication attribute for each device domain; determines, by the AS, whether a communication device belongs to the device domain managed by the AS according to information carried in a service request from the communication device, and if so, the communication attribute set for the network device is obtained, and a correspondence relationship between an identifier of the network device and the obtained communication attributes is created and stored; otherwise, access management on the communication device served as a user device is performed.

9 Claims, 3 Drawing Sheets

FOREIGN PATENT DOCUMENTS

| | | |
|---|---|---|
| CN | 1561042 | 5/2005 |
| CN | 1627738 | 6/2005 |
| CN | 100389575 | 5/2008 |
| JP | 2003143176 A | 5/2003 |
| JP | 2003167810 | 6/2003 |
| WO | WO 99/33228 A1 | 7/1999 |
| WO | WO2005/039143 | 4/2005 |

OTHER PUBLICATIONS

Communication issued in corresponding European Patent Application No. 06742156.0, mailed Oct. 20, 2010.

Written Opinion of the International Searching Authority for PCT/CN2006/001287 dated Oct. 16, 2006.

* cited by examiner

METHOD AND SYSTEM FOR IMPLEMENTING NETWORK DEVICE ACCESS MANAGEMENT

FIELD OF THE INVENTION

The present invention relates to device access technology in a communication network, and in particular to a method and system for implementing network device access management.

BACKGROUND OF THE INVENTION

In an existing communication network, applications of Access Server (AS) have become wide increasingly. The AS is typically located at a convergence layer of the communication network and is primarily adapted to perform communication management including access management for a user device and a network device. There are various types of access servers such as a Broadband Access Server (BTAS) which is primarily applied in a broadband communication network. The user device typically refers to a communication device with which an ordinary network user has an access to the communication network, such as a Personal Computer (PC) and a notebook computer. The network device typically refers to a communication device provided by a network operator or a network service provider, located at an access layer of the communication network and adapted to support an access of the user device to the communication network, such as a Digital Subscriber Line Access Multiplexer (DSLAM), a Local Area Network Switch (LAN Switch), an Access Point (AP) and a Cable Modem Terminal System (CMTS).

When the network device and the user device request for accessing a core layer of the communication network, the AS needs to perform access management for the network device and the user device so that the network device and the user device can access the core layer successfully. In a commonly used access management method, the AS regards any communication device issuing a service request as a user equipment and configures the communication device issuing the service request with communication parameters such as an Access Control List (ACL), a Quality of Service (QoS), an authentication policy and a billing policy.

However the network device is intended to support the user device accessing the communication network and is typically not configured with communication parameters such as an authentication policy and a billing policy, and therefore a human operator needs to perform second maintenance or modification of the communication parameters of the network device configured by the AS so as to disable or cancel the communication parameters unnecessary to be configured for the network device. This causes the human operator to perform second maintenance or modification of the communication parameters for numerous network devices and thus reduces greatly the speed of an access of the network device to the communication network. Further excessive second maintenance or modification operations tend to cause operation errors and hence affect normal communication of the network device and finally affect normal communication of the user device and lower user satisfaction.

A more important problem lies in that the AS needs to allocate a user Connectivity Information Block (CIB) table to each communication device for storing the configured communication parameters after configuring the communication parameters for respective network devices or user devices. Because the CIB table usually stores numerous communication parameters which occupy a large amount of memory space in the AS, the number of CIB tables allocated and stored by the AS is very limited, which may result in that the AS can only support a limited number of communication devices accessing the communication network,

SUMMARY OF THE INVENTION

In view of this, a main object of the invention is to provide a method for implementing network device access management so as to reduce occupancy of a memory in an access server and increase the number of communication devices for which the access server can perform access management.

Another object of the invention is to provide a system for implementing network device access management so as to reduce occupancy of a memory in an access server and increase the number of communication devices for which the access server can perform access management.

In order to achieve the above objects, technical solutions of the invention are as follows.

The invention discloses a method for implementing network device access management, in which all network devices are grouped into at least one device domain managed by at least one Access Server (AS) and a uniform communication attribute is set for each device domain and the method further includes:

a. receiving, by the AS, a service request from a communication device, and determining whether the communication device sending the request is a network device in the device domain managed by the AS according to identifier information carried in the service request, and if so, going to step b; otherwise, performing access management on the communication device served as a user device and ending the method; and b. obtaining the communication attribute set for the network device, and creating and storing a correspondence relationship between an identifier of the network device and the obtained communication attribute.

The method for setting a uniform communication attribute for each device domain is:

setting a device domain information table for each device domain, the device domain information table stores at least a device domain name, a device domain address pool, a user connectivity information block (CIB) table index and a network device communication attribute.

in step b, storing includes:

storing the communication attribute and the corresponding identifier of the network device in the CIB table together; or determining whether the CIB table stores the communication attribute, and if so, creating the correspondence relationship between the identifier of the network device and the communication attribute stored in the CIB table and storing the identifier of the network device in the CIB table; otherwise, storing the communication attribute and the corresponding identifier of the network device in the CIB table together.

in the step a, the determining includes:

reading, by the AS, user configuration information included in the received service request, determining whether a user configuration information stored in the AS is the same as the user configuration information read in the service request, and if so, determining, by the AS, whether a network device identity is stored in the AS in correspondence with the user configuration information, and if so, determining that the communication device is one of the network devices in the device domain managed by the AS; otherwise, determining that the communication device is not a network device in the device domain managed by the AS.

in the step a, the determining includes:

reading, by the AS, user configuration information included in the received service request, determining whether the user configuration information includes a network device identity and if not, determining that the communication device is not a network device in the device domain managed by the AS; if so, reading a device domain name included in the service request, determining whether the AS manages a device domain corresponding to the domain name; and if so, determining that the communication device is a network device in the device domain managed by the AS; otherwise, determining that the communication device is not a network device in the device domain managed by the AS.

In the step b, obtaining of the communication attributes includes: reading, by the AS, a device domain name included in the service request, and searching and reading a communication attribute corresponding to the device domain name in the AS.

The network device can be a DSLAM, a LAN Switch, an AP or a CMTS.

In the step a, the service request can be an access request.

In the step b, the identifier of the network device is a network device name, an Internet Protocol IP address allocated for the network device, an MAC address or other appointed information (e.g. a specific OPTION in the DHCP protocol).

The access server can be a broadband access server.

The invention further discloses a system for implementing network device access management, including:

at least one device domain storage module, each device domain storage module stores a uniform communication attribute of a device domain, all network device being grouped into at least one device domain; and at least one AS, adapted for communication management including management of the device domain;

the AS further includes a determining module adapted to determine whether a communication device sending a service request is a network device in a device domain managed by the AS according to identifier information carried in the service request by the AS, and if so, a network device access management unit of the AS is triggered to perform processing; otherwise, a user device access management unit of the AS is triggered to perform processing;

the network device access management unit is adapted to obtain from the device domain storage module a communication attribute corresponding to the network device sending the service request and to create and store a correspondence relationship between an identifier of the network device and the obtained communication attribute;

the user device access management unit is adapted to perform access management on the communication device sending the service request served as a user device.

Preferably, each device domain storage module corresponds to a device domain information table, the device domain information table stores at least a device domain name, a device domain address pool, a user connectivity information CIB table index and a network device communication attribute.

Preferably, the network device can be a DSLAM, a LAN Switch, an AP or a CMTS.

Preferably, the identifier of the network device can be a network device name, an IP address allocated for the network device, an MAC address or appointed information.

Preferably, the access server can be a broadband access server.

As compared with the related art, in the method for implementing network device access management according to the invention, all device networks are grouped into at least one device domain and uniform communication attributes are set for the network devices in the same device domain, so that occupancy of a memory in the AS can be reduced significantly and the number of communication devices for which the AS can perform access management is increased. Further, it is not necessary for a human operator to perform second maintenance or parameter modification for the network device due to separate management of a network device and a user device, thereby the number of operations to be performed for management of an access of the network device is reduced and thus both the speed of an access of the network device to the communication network and user satisfaction are improved significantly.

DETAILED DESCRIPTION OF THE INVENTION

Figure 1:
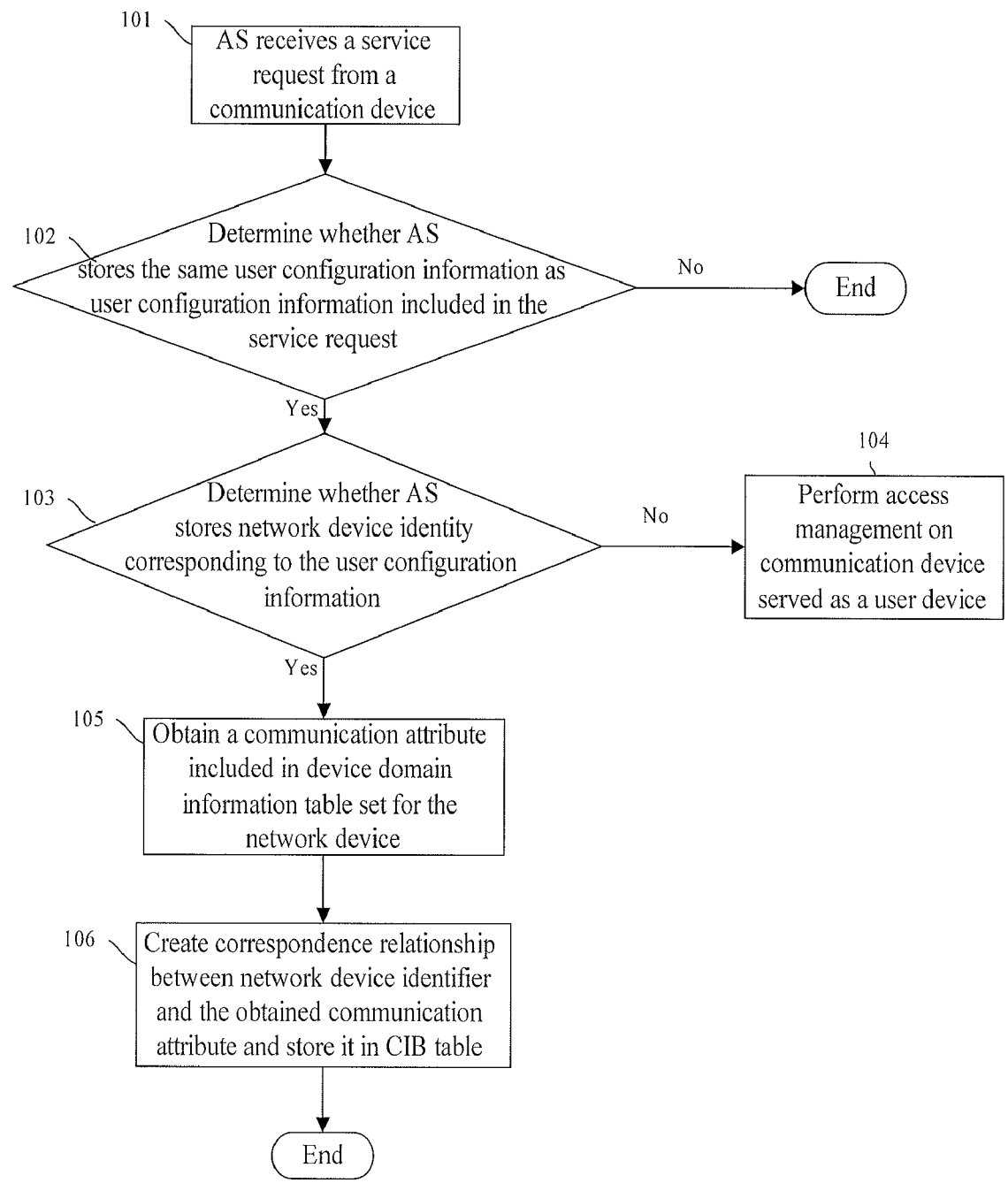
FIG. 1 is a flowchart of network device access management according to a preferred embodiment of the invention.

The invention is described in detail as follows in conjunction with the accompanying drawings and embodiments.

A method for implementing network device access management according to the invention can apply to various access modes, such as a communication device access mode with static address allocation, a communication device access mode with a Dynamic Host Configuration Protocol (DPCH) function and a communication device access mode with a Point to Point Protocol (PPP) function.

A specific method for implementing network device access management includes grouping all network devices into at least one device domain managed by at least one AS and setting a uniform communication attribute for each device domain. The method further includes:

a. receiving, by the AS, a service request from a communication device, and determining whether the communication device sending the request is a network device in the device domain managed by the AS according to identifier information carried in the received service request, and if so, going to step b; otherwise, performing access management on the communication device served as a user device and ending the method; and b. obtaining the communication attribute set for the network device, and creating and storing a correspondence relationship between an identifier of the network device and the obtained communication attribute.

In practice, no matter whatever access mode is applied to a communication device on which access management is performed, all network devices need to be grouped into at least device domain managed by at least one AS in advance, and each device domain needs to be set with a uniform communication attribute. If there is only one AS in the entire communication network, all the network devices in the communication network are grouped into at least one device domain managed by the AS, and if there is a plurality of ASs in the entire communication network, all the communication devices in the communication network are grouped respectively into at least one device domain managed by the different ASs.

Grouping of device domain can be based upon a specific grouping principle. For instance, geographically adjacent network devices can be grouped into one device domain, and also network devices with the same or similar communication bandwidth level or access privilege can be grouped into one device domain. Any one or more network devices can also be grouped into one device domain.

Generally, a method for setting the communication attribute includes: setting a device domain information table for each device domain, the device domain information table stores contents such as a device domain name, a device domain address pool, a CIB table index and a network device communication attribute that may apply to all the network devices in the device domain. The network device communication attribute typically includes configuration parameters required for configuration of the network devices such as a Committed Access Rate (CAR), an ACL, a transport priority and a Virtual Private Network (VPN).

The AS can perform access management on the communication device after grouping of device domain and setting of the communication attributes for the device domain.

For a communication device with a statically allocated address, the AS is preset with user configuration information of the communication device and a network device identity corresponding to the user configuration information. A specific access management flow is as illustrated in FIG. 1 and includes the following.

Block 101: The AS receives in a real time way from a communication device a service request including user configuration information of the communication device. If the communication device is a network device, the user configuration information further includes a network device identity, typically a name of a device domain to which the network device belongs or a data structure consisted of a device domain name and a network device name. The service request is typically an access request in the flow depicted in FIG. 1.

Block 102: The AS upon receipt of the service request from the communication device reads the user configuration information included in the service request, determines whether a user configuration information stored in the AS is the same as the user configuration information read in the service request, and if so, determines that the communication device can be managed by the AS, the flow goes to the block 103; otherwise, the flow ends.

Block 103: The AS determines whether it itself stores the network device identity stored in correspondence with the user configuration information, and if so, the flow goes to the block 105; otherwise, the flow goes to the block 104.

Block 104: The AS determines that the communication device is a user device and manages the communication devices with a commonly used method, and the flow ends.

A method through which the AS performs access management on the communication device typically includes that the AS configures the communication device with a communication attribute enabling normal communication of the communication device according to the user configuration information included in the service request, sets a CIB table and stores the configured communication attribute in the CIB table. Thus during subsequent communication of the communication device with the network side, the AS can perform communication management on the communication device with the communication attribute stored in the CIB table.

Block 105: The AS determines that the communication devices is a network device and searches and reads the communication attribute corresponding to the device domain name included in the service request. Specifically, the AS reads the device domain name included in the service request and searches the same device domains as the device domain name read in the respective device domain information tables stored in the AS. When the AS finds the device domain name in one of the device name information tables, the AS determines that the communication attribute included in the found device domain information table is a communication attributes set for the network device and reads the communication attribute included in the device domain information table.

Block 106: A correspondence relationship between the obtained communication attribute and the identifier of the network device is created and stored. A commonly used storage method includes that the communication attribute and the corresponding identifier of the network device are stored together in a CIB table. The CIB table is a unique CIB table set by the AS for the device domain to which the network device belongs. The communication attribute and the corresponding identifier of the network device can also be stored respectively in the CIB table and a routing Forwarding Information Block (FIB) or other data structure.

The identifier of the network device can be an identifier which can uniquely distinguish different network devices such as a network device name and an Internet Protocol (IP) address allocated for the network device.

The AS accomplishes the access management on the network device after the above operations, and during subsequent communication of the network device with the network side, the AS can perform communication management on the network device with the communication attribute stored in the CIB table corresponding to the identifier of the network device.

It can be seen that in the method for implementing network device access management as illustrated in FIG. 1 respective network devices belonging to the same device domain are configured with uniform communication attribute and the configured communication attribute is stored in a CIB table, thereby occupancy of a memory in the AS is reduced significantly and the number of communication devices on which the AS can perform access management is increased. Further in practice, the communication attribute configured uniformly for a device domain can usually be applicable to all network devices in the device domain, and therefore normal communication of the network devices in the device domain will not be affected.

Figure 2:
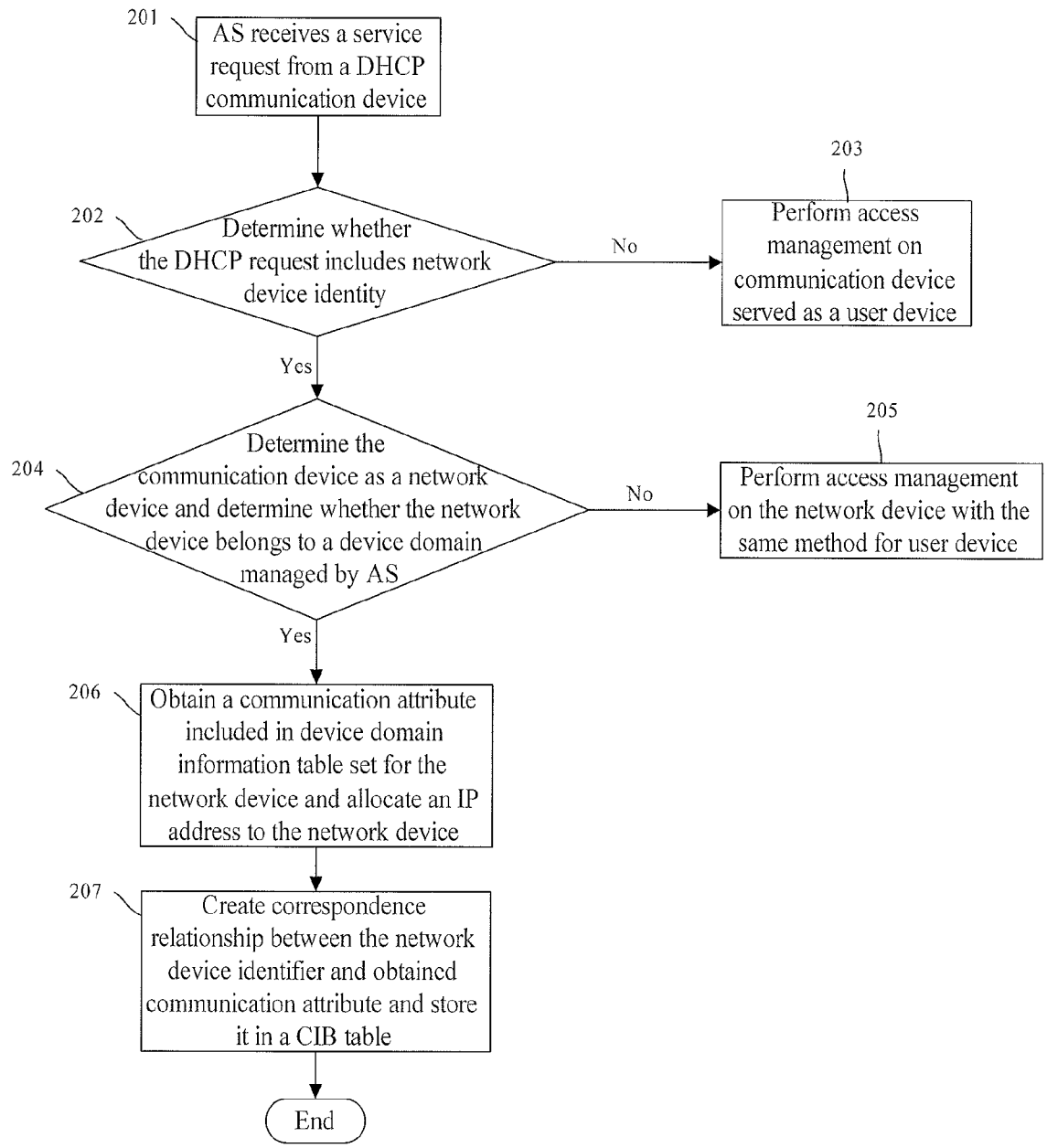
FIG. 2 is a flowchart of network device access management according to another preferred embodiment of the invention.

For a communication device, a specific access management flow after grouping of a device domain and setting a communication attribute for the device domain is as illustrated in FIG. 2 and includes the following.

Block 201: The AS receives in a real time way from a communication device a service request including user configuration information of the communication device. If the communication device is a network device, the user configuration information further includes a network device identity. The network device identity is typically a name of a device domain to which the network device belongs and can also be a data structure consisting of a device domain name and a network device name. The service request is typically an access request in the flow depicted in FIG. 1.

Block 202: The AS upon receipt of the service request from the communication device reads the user configuration information included in the service request, determines whether the read user configuration information includes a network device identity, and if so, the flow goes to the step 204; otherwise, the flow goes to the block 203.

Block 203: The AS determines that the communication device is a user device and performs access management on the communication devices with a commonly used method, and the flow ends. A method in which the AS performs access management on the communication device is the same as the access management method in the block 104.

Block 204: The AS determines that the communication device is a network device and further determines whether the network device belongs to a device domain managed by the AS, and if so, the flow goes to the block 206; otherwise, the flow goes to the block 205.

A specific determination method includes typically that the AS reads the device domain name included in the service request, determines whether there is a device domain information table among respective device domain information tables stored in the AS includes the same device domain name as the device domain name read, and if so, the AS determines that the network device belongs to a device domain managed by itself; otherwise, the AS determines that the network device does not belong to any device domain managed by itself.

Block 205: The AS performs access management on the network device with the same method for the user device and the flow ends. Particularly, a method in which the AS performs access management on the network device is the same as the access management method in the block 203.

Block 206: The AS searches and reads communication attributes corresponding to the device domain name included in the service request. Specifically, the AS reads the device domain name included in the service request and searches the same device domains as the device domain name read in the respective device domain information tables stored in the AS. When the AS finds the device domain name in one of the device name information tables, the AS determines that the found device domain information table is a device domain information table set for the network device and further that communication attribute included in the device domain information table is a communication attribute set for the network device and reads the communication attribute included in the device domain information table.

Further, the AS selects an IP address from an IP address pool included in the device domain information table set for the network device and allocates the network device with the IP address.

Block 207: A correspondence relationship between the obtained communication attribute and the identifier of the network device is created and stored. A commonly used storage method includes that the communication attribute and corresponding identifier of the network device are stored together in a CIB table. The CIB table is a unique CIB table set by the AS for the device domain to which the network device belongs. The communication attribute and the corresponding identifier of the network device can also be stored respectively in the CIB table and a routing Forwarding Information Block (FIB) or another data structure.

It can be seen from FIGS. 1 and 2 that when none of network devices belonging to a device domain has an access to the AS, no communication attribute of the network device is stored in the CIB table yet. Each time a network device belonging to the device domain accesses the AS, a communication attribute stored each time in the CIB table is the same as communication attribute stored in the previous storage. In this case, the communication attributes in previous storage can be overwritten with the communication attribute currently to be stored. Alternatively, it can also be determined before storage of the communication attribute whether the CIB table stores any communication attribute, and if so, a correspondence relationship can be created between the identifier of the network device and the communication attribute stored in the CIB table, and the identifier of the network device can be stored in the CIB table; otherwise, a correspondence relationship between the identifier of the network device and the communication attribute read can be created and stored in the CIB table.

The identifier of the network device can be an identifier which can uniquely distinguish different network devices such as a network device name, and an IP address allocated for the network device, a MAC address and other appointed information (e.g. a specific OPTION in the DPCH protocol).

The AS accomplishes access management on the DHCP network device after the above operations, and during subsequent communication of the network device with a network side, the AS can perform communication management on the network device with the communication attribute stored in the CIB table corresponding to the identifier of the network device.

It can be seen that in the method for implementing network device access management as illustrated in FIG. 2, respective network devices belonging to the same device domain are configured with a uniform communication attribute and the communication attribute of the respective network devices belonging to the same device domain is stored in a CIB table, thereby occupancy of a memory in the AS is reduced significantly and the number of communication devices on which the AS can perform access management is increased. Further in practice, the communication attribute configured uniformly for a device domain can usually be applicable to all network devices in the device domain, and therefore normal communication of the network devices in the device domain will not be affected.

Further for communication device with a PPP function, a specific access management flow after grouping of a device domain and setting communication attributes for the device domain is the same as the flow illustrated in FIG. 2 except that a communication protocol supported by the communication device with the PPP function is different from the communication protocol supported by the communication device with the DHCP function.

It can be seen that in the method for implementing network device access management provided according to the invention, occupancy of a memory in the AS can be reduced significantly and the number of communication devices on which the AS can perform access management is increased. Further, it is not necessary for a human operator to perform second maintenance or parameter modification for the network device due to separate management of the network device and the user device, thereby the number of operations to be performed for management of an access of the network device is reduced and both the speed of an access of the network device to the communication network and user satisfaction are improved significantly.

Figure 3:
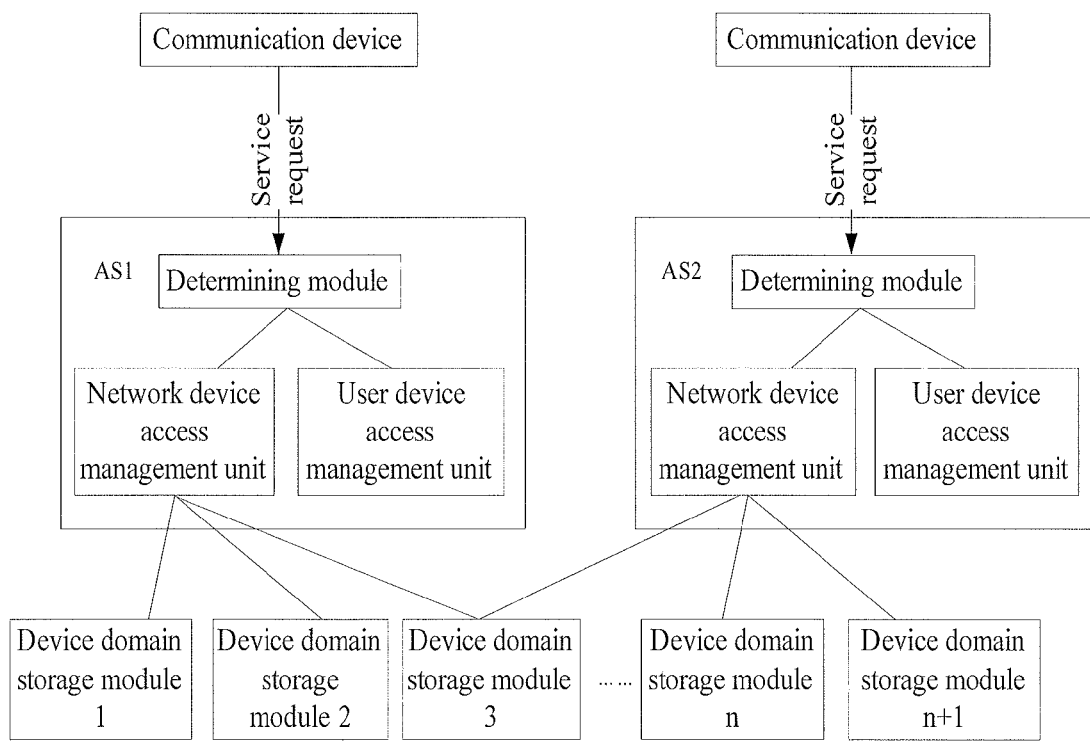
FIG. 3 is a structural diagram of the system for implementing network device access management according to the invention.

FIG. 3 is a structural diagram of the system for implementing network device access management according to the invention. Referring to FIG. 3, the system includes:

at least one device domain storage module, each device domain storage module stores a uniform communication attribute of a device domain, all network device being grouped into at least one device domain;

at least one AS, including functions of an existing AS and adapted for communication management including management of the device domain. The device domain storage module can be disposed separately from the AS or be disposed in the AS. In the embodiment illustrated in FIG. 3, for example, the device domain storage module is disposed separately from the AS. The device domain storage module can be managed by at least one AS.

Unlike the related art, the AS of the invention further includes a determining module and a network device access management unit. The determining module is adapted to determine whether a communication device sending the request is a network device in a device domain managed by the AS according to identifier information carried in a service request by the AS, and if so, the network device access management unit of the AS is triggered to perform processing; otherwise, a user device access management unit of the AS is triggered to perform processing.

The network device access management unit is adapted to obtain from the device domain storage module a communication attribute corresponding to the network device sending the request and to create and store a correspondence relationship between an identifier of the network device and the obtained communication attribute.

The user device access management unit is the same as a user device access management unit of an existing AS, and the communication device sending the service request is performed access management as a user device by the user device access management unit.

In a preferred solution of the system of the invention, each device domain storage module corresponds to a device domain information table, the device domain information table stores at least a device domain name, a device domain address pool, a user connectivity information CIB table index and a network device communication attribute.

Further, the network device can be a DSLAM, a LAN Switch, an AP or a CMTS. The identifier of the network device can be a network device name, an IP address allocated for the network device, an MAC address or other appointed information (e.g. a specific OPTION in the DPCH protocol). The access server can be a broadband access server.

The above description is merely illustration of the preferred embodiments of the invention, but the scope of the invention shall not be limited thereto. Any variations or alternatives which readily occur to those skilled in the art in light of the technical disclosure of the invention fall within the scope of the invention.

The invention claimed is:

1. A method for implementing network device access management, comprising:
   receiving, by an Access Server (AS), a service request from a communication device;
   determining, by the Access Server, whether the communication device that sent the request is a network device in a device domain managed by the Access Server according to identifier information carried in the received service request;
   obtaining, by the Access Server, a communication attribute for the network device, wherein the obtained communication attribute includes configuration parameters to configure at least one network device selected from the group consisting of: a Committed Access Rate (CAR), an Access Control List (ACL), a transport priority and a Virtual Private Network (VPN); and
   creating and storing, by the Access Server, a correspondence relationship between an identifier of the network device and the obtained communication attribute, if the communication device is a network device in the device domain managed by the Access Server.

2. The method according to claim 1, further comprising:
   performing access management on the communication device if the communication device that sent the request is not a network device in the device domain managed by the Access Server.

3. The method according to claim 1, wherein determining whether the communication device that sent the request is a network device in the device domain managed by the Access Server comprises:
   reading, by the Access Server, user configuration information comprised in the received service request;
   determining that a user configuration information stored in the Access Server is the same as the user configuration information read in the service request;
   determining, by the Access Server, whether a network device identity is stored in the Access Server in correspondence with the user configuration information; and
   determining that the communication device is one of the network devices in the device domain managed by the Access Server if a network device identity is stored in the Access Server in correspondence with the user configuration information.

4. The method according to claim 1, wherein determining whether the communication device that sent the request is a network device in the device domain managed by the Access Server comprises:
   reading, by the Access Server, user configuration information comprised in the received service request;
   determining that the user configuration information comprises a network device identity;
   reading a device domain name comprised in the service request and determining whether the Access Server manages a device domain corresponding to the domain name; and
   determining that the communication device is a network device in the device domain managed by the Access Server if the Access Server manages a device domain corresponding to the domain name.

5. The method according to claim 1, wherein the Access Server obtaining the communication attribute comprises:
   reading, by the Access Server, a name of a device domain comprised in the service request, and searching and reading a communication attribute corresponding to the device domain name in the Access Server.

6. The method according to claim 1, wherein before receiving, by the Access Server, the service request from a communication device, further comprises:
   grouping all network devices into at least one device domain managed by at least one Access Server and setting the communication attribute for each device domain.

7. The method according to claim 6, wherein setting the communication attribute comprises:
   setting a device domain information table, which stores a name of a device domain, a device domain address pool, a Connectivity Information Block (CIB) table index and the communication attribute, for each device domain.

8. The method according to claim 1, wherein, the identifier of the network device is a network device name, an Internet Protocol IP address allocated for the network device, a MAC address or appointed information.

9. The method according to claim 1, wherein the identifier information carried in the received service request includes a name of a device domain to which the network device belongs or a data structure consisted of the name of the device domain and a network device name.

* * * * *